United States Patent [19]

Yang

[11] Patent Number: 5,232,170
[45] Date of Patent: Aug. 3, 1993

[54] MATERIAL PUSHER

[76] Inventor: Mu-Tsang Yang, No. 52 Ta Pikg Rd., Tc Ti Li, Sha Lu Chen, Taichung Hsien, Taiwan

[21] Appl. No.: 848,461

[22] Filed: Mar. 9, 1992

[51] Int. Cl.$^5$ ............................ B02C 19/22; B30B 3/00
[52] U.S. Cl. .................................. 241/260.1; 100/145
[58] Field of Search ............... 241/260.1, 247; 100/94, 100/145, 146, 904

[56] References Cited

U.S. PATENT DOCUMENTS 3,548,743 12/1970 Pikel .................................... 100/145
3,788,567 1/1974 Yamada .............................. 241/247

Primary Examiner—Douglas D. Watts
Attorney, Agent, or Firm—Browdy and Neimark

[57] ABSTRACT

A material pusher comprises a cylindrical body, a threaded rod pivotally arranged in the cylindrical body, and a driving device for forcing the threaded rod to rotate. The threaded rod is provided with a circular rod-shaped pivot portion located near the driving device and provided with a pivotally disposed force-feeding element of conical construction having a tapered end facing the free end of the threaded rod to which it is pivotally attached. The force-feeding element and the threaded rod are driven by the driving device to rotate at different speeds.

1 Claim, 1 Drawing Sheet

MATERIAL PUSHER

BACKGROUND OF THE INVENTION

The present invention relates to a material pusher, and more particularly to a feeding section of the material pusher.

Referring to FIG. 1, a single-shafted material pusher of prior art is shown comprising a long tubular cylinder 11, a threaded rod 12 disposed pivotally in the cylinder 11, a driving device 13 for use in driving the threaded rod 12 to rotate, a feeding funnel 14 attached to a portion of the cylinder 11 adjacent to the driving device 13, and a heater for heating the cylinder 11. The granulated plastic material is fed into the cylinder 11 via the funnel 14 and is subsequently carried forward by the rotating threaded rod 12. In the meantime, the plastic material is subjected to melting caused by the heat generated by the heater 15, while it is being carried forward by the threaded rod 12. The molten plastic material is finally pushed out via a free end of the cylinder 11.

The rate of processing the granulated plastic material in the cylinder 11, as described above, is dependent to a great extend on the thread interval of the threaded rod 12. It is quite impractical to have the thread interval of the threaded rod 12 shortened with a view to accelerating the rate of processing the granulated plastic material. Therefore, the only workable option is to increase the rate of rotation of the threaded rod 12 and the heat generated by the heater 15. However, the threaded rod 12 should not be subjected to an excessive acceleration because the moment required for the threaded rod 12 to rotate is considerably large in view of the facts that the threaded rod 12 is rather long and that the granulated plastic material fed into the cylinder 11 must be compressed before it is heated. IN some instances, the granulated plastic wastes are washed and dried before they are fed into the feeding funnel of the material pusher. Such operation often runs the risk of getting the feeding funnel obstructed by the granulated plastic wastes. A conventional solution to such problem is to install in the feeding funnel a spiral blade, which serves to feed the material forcefully. However, such band-aid approach to the problem provides no permanent answer to a serious problem as such, because it fails to enhance the compression ratio of the plastic material in the threaded rod so as to accelerate the feeding speed.

SUMMARY OF THE INVENTION

It is therefore the primary objective of the present invention to provide a material pusher with means to adjust the rate of feeding process of the granulated plastic material and the compression ratio of the fed granulated plastic material.

It is another objective of the present invention to provide a material pusher with means to reduce the maximum power requirement of the driving device so as to bring about a reduction in production cost.

It is still another objective of the present invention to provide a material pusher with a shorter threaded rod so as to minimize the over-all space requirement of the material pusher.

In keeping with the principles of the present invention, the foregoing objectives are accomplished by a material pusher comprising a cylindrical body, a threaded rod pivotally arranged in the cylindrical body, and a driving device for forcing the threaded rod to rotate. The material pusher is characterized in that its threaded rod is provided with a pivot portion of circular rod-shaped construction located near the driving device. The pivot portion is provided with a pivotally disposed material force-feeding element of conical shape having a tapered end facing the free end of the threaded rod to which it is pivotally attached. In fact, the force-feeding element is a tapered threaded rod received in the feeding portion of the cylindrical body. The force-feeding element and the threaded rod are driven by the driving device to rotate at different speeds.

The foregoing objectives and features of the present invention will be better understood by studying the following detailed description of a preferred embodiment of the present invention in conjunction with the drawings provided herewith.

DETAILED DESCRIPTION OF THE PREFERRED EMBODIMENT

Figure 1:
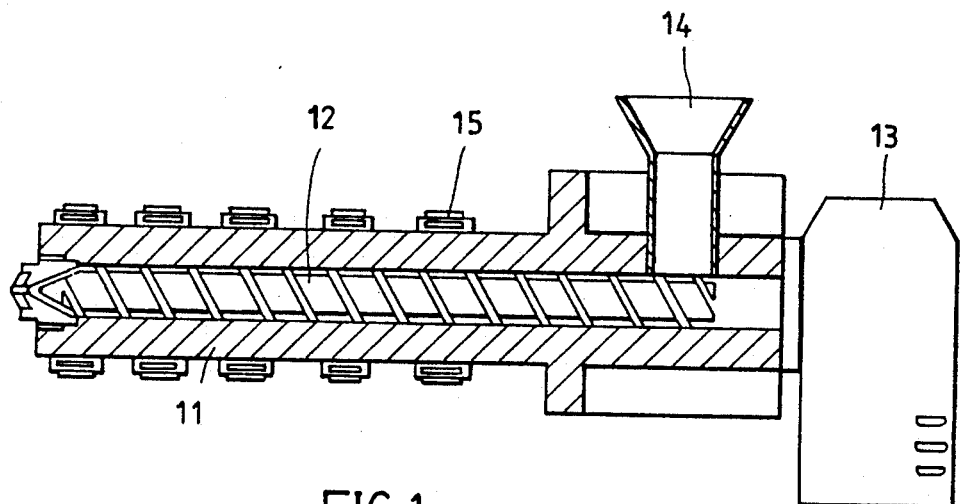
FIG. 1 shows a schematic view of a material pusher of prior art.
Figure 2:
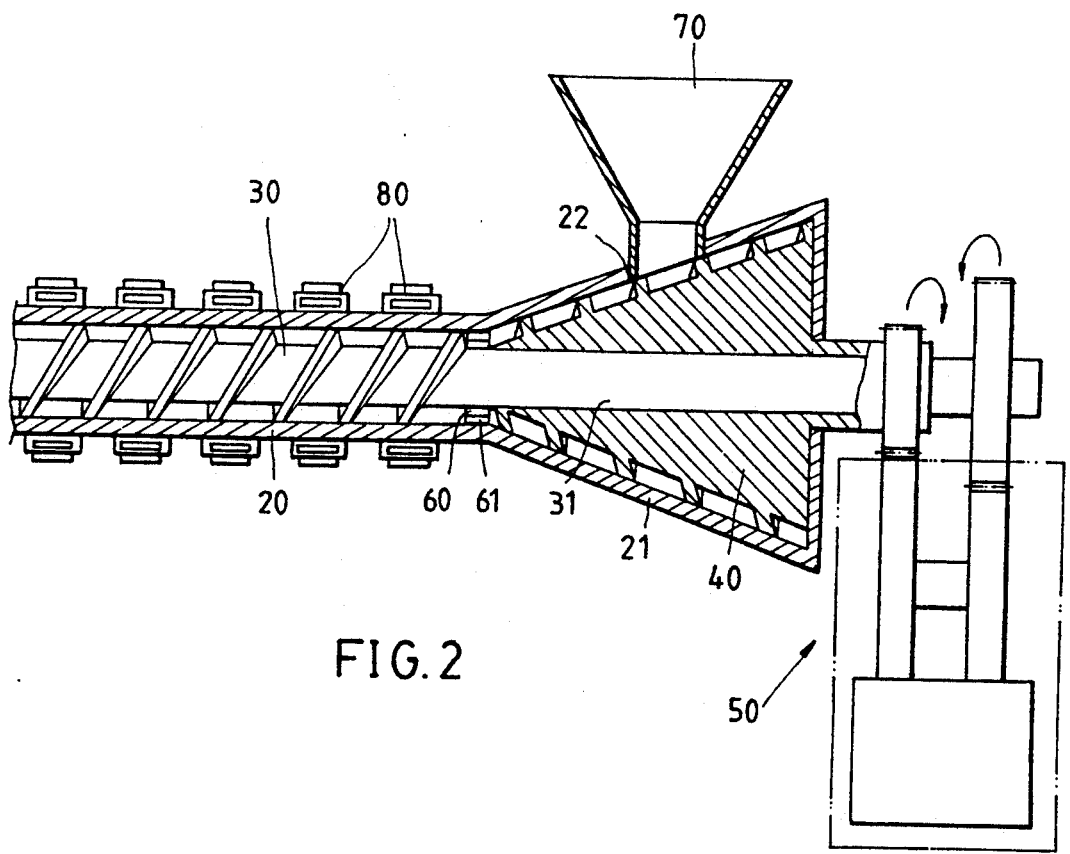
FIG. 2 shows a schematic view of a material pusher of the present invention.

Referring to FIG. 2, a material pusher embodied in the present invention is shown comprising a cylindrical body 20, a threaded rod 30, a material force-feeding element 40, a driving device 50, a material cutting element 60, a feeding funnel 70, and a set of electrical heaters 80.

The cylindrical body 20 has a feeding portion 21 with a feeding section conical in shape. The feeding portion 21 comprises thereon a feeding port 22.

The threaded rod 30 is pivotally arranged in the cylindrical body 20 and is provided with a pivot portion 31 located at the feeding portion 21 of the cylindrical body 20.

The material force-feeding element 40 is in fact a threaded rod conical in shape and is disposed at the pivot portion 31 of the threaded rod 30. It is received in the feeding portion 21 of the cylindrical body 20, with its outer edge being adjacent to the feeding portion 21.

The driving device 50 comprises a motor and a switch gear box, which are not shown in the drawing provided herein. The driving device 50 is used to drive the threaded rod 30 and the force-feeding element 40 to rotate oppositely. The threaded rod 30 rotates at a low speed, while the force-feeding element 40 rotates at a relatively high speed.

The material cutting element 60 is fastened to the portion of the threaded rod 30 adjacent to the tapered end of the force-feeding element 40. It is circular in shape and is provided with a plurality of sharp teeth 61 on its outer edge.

The feeding funnel 70 is disposed on the feeding port 22 of the cylindrical body 20.

The electrical heaters 80 arranged in the cylindrical body 20 are intended for use in heating the cylindrical body 20.

The plastic material (or waste) placed in the funnel 70 is introduced into the feeding portion 21 via the feeding port 22 and is subsequently subjected to compression by the force-feeding element 40. Upon being driven to the threaded rod 30 from the force-feeding element 40, the plastic material is cut and granulated by the material cutting element 60. The granulated plastic material is melted in the cylindrical body by the heat generated by the electrical heaters 80.

Therefore, advantages of the material pusher of the present invention over the prior art have become apparent and are further expounded explicitly hereinafter.

A greater compression ratio of the granulated plastic material is effectively achieved by means of the force-feeding element 40 of conical construction. In addition, the granulated plastic material is efficiently transported toward the threaded rod 30 without obstruction, thereby resulting in a better feeding operation.

The power requirement of the driving device 50 is greatly reduced in view of the fact that the threaded rod 30 and the force-feeding element 40 are transmitted separately. In other words, the compression of the plastic material takes place in the force-feeding element 40 so that the torsion required to turn the force-feeding element 40 is relatively smaller than that required to turn the single-shafted threaded rod of the prior art. In addition, as soon as the compressed plastic material is transferred to the cylindrical body 20, it is rapidly melted by the heat generated by the electrical heaters 80. As a result, the power that is needed to turn the threaded rod 30 is reduced substantially.

The threaded rod 30 and the force-feeding element 40 are driven to rotate in opposite directions at different speeds. Therefore, the speed at which the threaded rod 30 or the force-feeding element 40 rotates can be adjusted in accordance with the production requirement. The frictional heat generated during the compression of the plastic material in the force-feeding element 40 can be excessively high. If such incident occurs, a cooling fan or circulating cooling water can be installed at the feeding portion 21 so as to lower the temperature to a desired level.

The over-all length of the material pusher of the present invention can be substantially shortened so as to take up less floor space of the shop. Such deed is made possible by virtue of the facts that the threaded rod 30 and the force-feeding process and that the temperature inside the cylindrical body 20 can be raised to a higher level so as to shorten the time required for melting the compressed plastic material.

The embodiment of the present invention described above is to be considered in all respects as merely illustrative and not restrictive. Accordingly, the present invention may be embodied in other specific forms without deviating from the spirit thereof. Therefore, the present invention is to e limited only by the scope of the hereinafter appended claims.

What is claimed is:

1. A material pusher comprising;
a cylindrical body, a threaded rod pivotally disposed in said cylindrical body,
said threaded rod being provided with a circular rod-shaped pivot portion having a force-feeding means of conical construction pivotally arranged thereon,
wherein said cylindrical body comprises a feeding portion of conical construction located correspondingly to said force-feeding means,
driving means separately engaged to said circular rod shaped pivot portion and said force feeding means for independently rotating said threaded rod and said force feeding means at different speeds to each other,
said driving means rotating said force-feeding means and said threaded rod in opposite directions,
wherein said threaded rod is provided with a cutting means fastened to a portion thereof adjacent to a tapered end of said force-feeding means, said cutting means being circular in shape and having a plurality of sharp teeth arranged on outer edge thereof.

* * * * *